UNITED STATES PATENT OFFICE.

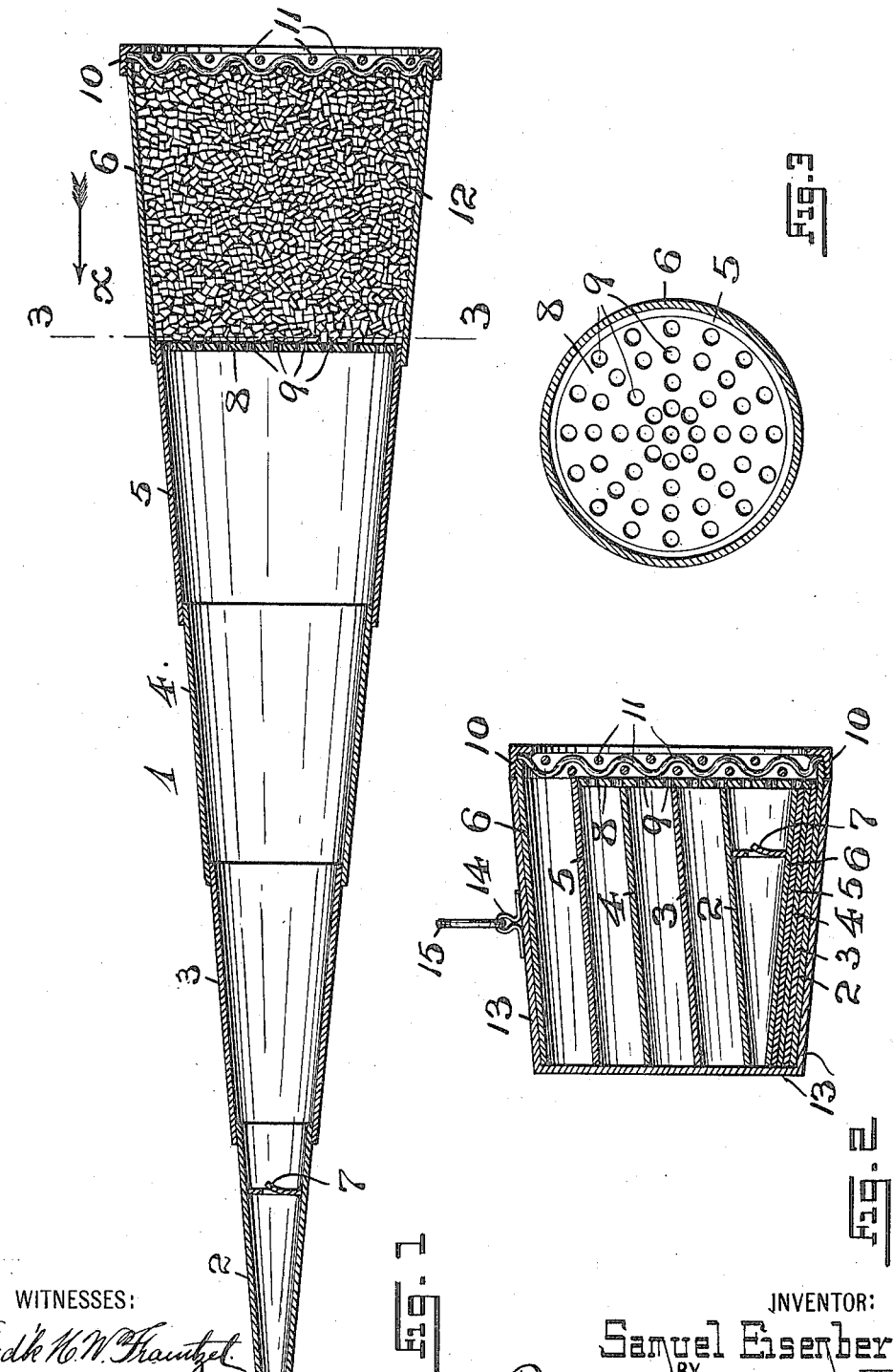

SAMUEL EISENBERG, OF NEWARK, NEW JERSEY.

HORN.

1,153,207. Specification of Letters Patent. Patented Sept. 14, 1915.

Application filed November 11, 1914. Serial No. 871,447.

*To all whom it may concern:*

Be it known that I, SAMUEL EISENBERG, a subject of the Emperor of Austria-Hungary, residing at Newark, in the county of Essex and State of New Jersey, have invented certain new and useful Improvements in Horns; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in toy-horns; and, the present invention has reference, more particularly, to a novel toy-horn comprising a suitable number of telescopically disposed sectional members, all arranged so that the several members can be easily brought into extended relation, to produce a complete horn, or said sections being adapted to be brought into collapsed relation, so as to bring the parts of the horn into nested relation with each other and to produce a very small package, which may be readily carried in the pocket when the horn is not in use.

The present invention, therefore, has for its principal object to provide a horn comprising a number of collapsibly disposed sectional members for the purposes hereinabove stated.

The invention has for its further object to provide in connection with a horn of the character stated an inclosing shell or casing in which the horn-sections may be easily arranged when in their nested or collapsed relation.

The invention has for its further object to provide in connection with a horn, means forming with one of the horn-sections a chamber for the reception of a quantity of confetti, and a screen-cover which ordinarily retains the confetti within said chamber, but through the meshes of which the confetti is readily forced when blowing the horn.

Other objects of the present invention not at this time more particularly enumerated will be clearly understood from the following detailed description of the present invention.

With the various objects of the present invention in view, the said invention consists, primarily, in the novel horn hereinafter set forth; and, the invention consists, furthermore, in the novel arrangements and combinations of the various devices and parts, as well as in the details of the construction of the said parts, all of which will be more fully described in the following specification, and then finally embodied in the clauses of the claim which are appended to and which form an essential part of the said specification.

The invention is clearly illustrated in the accompanying drawings, in which:—

Figure 1 is a longitudinal vertical section of a complete horn made according to and showing one embodiment of the principles of the present invention. Fig. 2 is a similar sectional representation of the horn, illustrating the several horn-sections in their nested or collapsed relation and arranged within an inclosing shell or casing and a screen-cover, the said shell or casing and the screen-cover also being represented in vertical section; and Fig. 3 is a transverse section, said section being taken on line 3—3 in said Fig. 1, looking in the direction of the arrow x.

Similar characters of reference are employed in the said several figures of the drawings, to indicate corresponding parts.

In the said drawings, the reference-character 1 indicates the complete horn, the same comprising any suitable number of hollow truncated cones, forming the several horn-sections of the horn. In the present case, I have shown the horn as being comprised of five of such hollow truncated cones, the same being respectively indicated by the reference-characters 2, 3, 4, 5 and 6, but it will be evident that any other number of such cone-sections may be employed, if desired.

As shown more particularly in Fig. 1 of the drawings, the several truncated cones increase relatively in size from the one end of the horn to the other end of the horn, the rear end-portion of each horn-section being relatively smaller than the front end-portion of the next-succeeding horn-section, and the same being in registration with each other, as shown in said Fig. 1, the various sections can be readily brought into frictional retaining engagement, so as to provide a complete horn of the general conformation and construction represented in said Fig. 1 of the drawings. The horn-section 2, as will be evident, provides the mouth-piece of the complete horn, the said section 2 having also suitably disposed therein a reed, as 7, of any suitable construction.

Within the end of the next-to-last horn-section, as 5, there may be suitably disposed a disk or plate, as 8 formed with suitably disposed perforations 9, or other suitably-shaped openings, the purposes of which are self-evident. Over the rear end-portion of the last horn-section, as 6, is suitably slipped, and suitably held by friction, or otherwise, so as to be adapted to be removed from engagement with said horn-section 6, if desired, a screen-cover, said cover comprising a bezel 10 in which is suitably mounted a wire-mesh screen 11, or similar means through which confetti 12, adapted to be contained in the chamber formed by the horn-section 6, the disk or plate 8 and the screen-cover, is expelled when blowing into the mouthpiece of the horn, as will be clearly evident.

When the horn is not in use, the several horn-sections can be easily brought from their frictional holding engagement indicated in said Fig. 1, to their nested or collapsed relation, represented in Fig. 2 of the drawings, by pressing upon both ends of the horn, so as to produce a very small package which can be readily and most conveniently carried in the pocket. When thus collapsed, the nested horn-sections may be inclosed in a suitably formed shell or casing, as 13, which is readily slipped over the nested sections and is held in place by friction, or otherwise. If desired, the said shell or casing 13 may be provided with a suitably formed bail, as 14, and a ring 15, or other suitable means, for carrying the package.

Of course I am aware that some changes may be made in the general arrangements and combinations of the various devices and parts, as well as in the details of the construction of the said parts, without departing from the scope of the present invention as set forth in the foregoing specification and as defined in the claims which are appended thereto. Hence, I do not limit my present invention to the exact arrangements and combinations of the various devices and parts as described in the said specification, nor do I confine myself to the exact details of the construction of the said parts, as illustrated in the accompanying drawings.

I claim:—

1. A horn comprising a series of hollow truncated cone-shaped sections adapted to be brought into nested relation and also in frictional holding engagement to provide a complete horn, one of said sections being provided with a reed and serving as a mouthpiece, combined with means for retaining confetti within the horn.

2. A horn comprising a series of hollow truncated cone-shaped sections adapted to be brought into nested relation and also in frictional holding engagement to provide a complete horn, one of said sections being provided with a reed and serving as a mouthpiece, combined with a perforated disk in one of said horn-sections, and an end screen-cover, all arranged to provide a chamber for the reception of confetti.

In testimony, that I claim the invention set forth above I have hereunto set my hand this 9th day of November, 1914.

SAMUEL EISENBERG.

Witnesses:
FREDK. C. FRENTZEL,
FREDK. H. W. FRAENTZEL.

Copies of this patent may be obtained for five cents each, by addressing the "Commissioner of Patents, Washington, D. C."